(12) United States Patent
Cocchi et al.

(10) Patent No.: US 11,051,531 B2
(45) Date of Patent: Jul. 6, 2021

(54) MACHINE AND METHOD FOR MAKING LIQUID AND SEMI-LIQUID PRODUCTS OF THE ICE CREAM SECTOR

(71) Applicant: ALI GROUP S.r.l.—CARPIGIANI, Cernusco sul Naviglio (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernusco sul Naviglio (IT)

( * ) Notice: Subject to any disclaimer, the term of this patent is extended or adjusted under 35 U.S.C. 154(b) by 356 days.

(21) Appl. No.: 15/947,397

(22) Filed: Apr. 6, 2018

(65) Prior Publication Data

US 2018/0303122 A1    Oct. 25, 2018

(30) Foreign Application Priority Data

Apr. 21, 2017    (IT) .......................... 102017000043975

(51) Int. Cl.
*A23G 9/28* (2006.01)
*A23G 9/12* (2006.01)
(Continued)

(52) U.S. Cl.
CPC ............... *A23G 9/282* (2013.01); *A23G 9/12* (2013.01); *A23G 9/20* (2013.01); *A23G 9/228* (2013.01);
(Continued)

(58) Field of Classification Search
CPC ... A23G 9/28; A23G 9/22; A23G 9/08; A23G 9/12; A23G 9/282; A23G 9/20;
(Continued)

(56) References Cited

U.S. PATENT DOCUMENTS 3,158,485 A    11/1964    De Santa Luce
3,327,615 A    6/1967    Swan et al.
(Continued)

FOREIGN PATENT DOCUMENTS

CN    1289549 C    4/2001
CN    1813558 A    8/2006
(Continued)

OTHER PUBLICATIONS

Cocchi—U.S. Appl. No. 15/285,876, filed Oct. 5, 2016.
(Continued)

*Primary Examiner* — Cassey D Bauer
(74) *Attorney, Agent, or Firm* — Shuttleworth & Ingersoll, PLC; Timothy Klima

(57) ABSTRACT

A machine for making liquid and/or semi-liquid products of the ice cream sector comprises a processing container forming a processing chamber for making an ice cream product, a stirrer mounted inside the processing chamber, a cooling system equipped with at least one heat exchanger associated with the processing container, for exchanging heat with the container and cooling the processing container and a unit for receiving and treating a capsule containing a basic preparation for an ice cream product, configured to allow the capsule to be compressed in such a way so as to deform lateral walls of the capsule and to squeeze the basic preparation out of the capsule and transfer it to the processing container.

24 Claims, 7 Drawing Sheets

(51) Int. Cl.
  *A23G 9/20* (2006.01)
  *A23G 9/22* (2006.01)
  *A23G 9/30* (2006.01)
  *A23G 9/40* (2006.01)
  *A23G 9/42* (2006.01)
(52) U.S. Cl.
  CPC .................. *A23G 9/30* (2013.01); *A23G 9/40* (2013.01); *A23G 9/42* (2013.01)
(58) Field of Classification Search
  CPC . A23G 9/228; A23G 9/30; A23G 9/40; A23G 9/42
  See application file for complete search history.

(56) References Cited

U.S. PATENT DOCUMENTS

| | | | |
|---|---|---|---|
| 3,474,821 A | 10/1969 | Fuller et al. | |
| 3,492,126 A | 1/1970 | Rubenstein et al. | |
| 3,517,524 A | 6/1970 | Fiedler et al. | |
| 3,803,870 A | 4/1974 | Conz | |
| 3,969,531 A | 7/1976 | Cornelius | |
| 4,169,359 A | 10/1979 | Weerstra | |
| 4,201,558 A | 5/1980 | Schwitters et al. | |
| 4,659,575 A | 4/1987 | Fiedler | |
| 5,235,902 A | 8/1993 | Ogawa et al. | |
| 5,269,146 A | 12/1993 | Kerner | |
| 5,312,020 A | 5/1994 | Frei | |
| 5,713,214 A | 2/1998 | Ugolini | |
| 5,724,883 A | 3/1998 | Usherovich | |
| 5,967,226 A | 10/1999 | Choi | |
| 6,058,721 A | 5/2000 | Midden et al. | |
| 6,182,862 B1 | 2/2001 | McGill | |
| 6,438,987 B1 | 8/2002 | Pahl | |
| 8,651,011 B2 | 2/2014 | Sinzig | |
| 9,968,113 B2 | 5/2018 | Cocchi | |
| 10,172,373 B2 | 1/2019 | Cocchi | |
| 2001/0028913 A1 | 10/2001 | Kolar et al. | |
| 2002/0043071 A1 | 4/2002 | Frank et al. | |
| 2002/0048626 A1 | 4/2002 | Miller et al. | |
| 2004/0003620 A1 | 1/2004 | Cocchi et al. | |
| 2005/0103024 A1 | 5/2005 | Rugeris | |
| 2005/0178793 A1 | 8/2005 | Cheng et al. | |
| 2006/0169147 A1 | 8/2006 | Cocchi et al. | |
| 2006/0201329 A1 | 9/2006 | Lynch | |
| 2007/0051248 A1 | 3/2007 | Lee et al. | |
| 2007/0110872 A1 | 5/2007 | Gerber | |
| 2009/0136639 A1 | 5/2009 | Doglioni Majer | |
| 2009/0323462 A1 | 12/2009 | Cocchi et al. | |
| 2010/0034950 A1 | 2/2010 | Jones et al. | |
| 2010/0122539 A1 | 5/2010 | Cocchi et al. | |
| 2010/0199846 A1 | 8/2010 | Aus der Fuenten et al. | |
| 2010/0229728 A1 | 9/2010 | Kiefer et al. | |
| 2010/0242497 A1 | 9/2010 | Bertone | |
| 2010/0263544 A1 | 10/2010 | Kodden et al. | |
| 2010/0266740 A1 | 10/2010 | Van Den Aker et al. | |
| 2011/0014339 A1 | 1/2011 | Stahl et al. | |
| 2011/0045152 A1 | 2/2011 | Stutz et al. | |
| 2011/0310695 A1 | 12/2011 | Sus et al. | |
| 2012/0074176 A1 | 3/2012 | Sullivan et al. | |
| 2012/0199608 A1 | 8/2012 | Cocchi et al. | |
| 2012/0217264 A1 | 8/2012 | Cocchi et al. | |
| 2013/0000338 A1 | 1/2013 | Cocchi et al. | |
| 2013/0152797 A1 | 6/2013 | Mori | |
| 2013/0263747 A1 | 10/2013 | Ugolini | |
| 2013/0287914 A1 | 10/2013 | Fragniere | |
| 2014/0026761 A1 | 1/2014 | Bartoli et al. | |
| 2014/0134299 A1 | 5/2014 | Guidorzi et al. | |
| 2014/0212559 A1 | 7/2014 | Cocchi et al. | |
| 2014/0335232 A1 | 11/2014 | Beth Halachmi | |
| 2014/0345652 A1 | 11/2014 | Meng | |
| 2015/0141313 A1 | 5/2015 | Aregger et al. | |
| 2015/0150412 A1 | 6/2015 | Heitele | |
| 2015/0272382 A1 | 10/2015 | Truninger et al. | |
| 2015/0289539 A1 | 10/2015 | Noth et al. | |
| 2015/0320078 A1 | 11/2015 | Cocchi | |
| 2015/0329282 A1 | 11/2015 | Bartoli et al. | |
| 2015/0329343 A1 | 11/2015 | Kleinrchert | |
| 2016/0007626 A1 | 1/2016 | Choi et al. | |
| 2016/0052706 A1 | 2/2016 | Talon et al. | |
| 2016/0214787 A1 | 7/2016 | Iotti | |
| 2016/0242594 A1 | 8/2016 | Empl et al. | |
| 2016/0249761 A1 | 9/2016 | Llopis | |
| 2016/0302443 A1 | 10/2016 | Lazzarini et al. | |
| 2016/0316781 A1 | 11/2016 | Zappoli et al. | |
| 2017/0042181 A1 | 2/2017 | Fiaschi | |
| 2017/0112165 A1 | 4/2017 | Cocchi et al. | |
| 2017/0135520 A1 | 5/2017 | Sato et al. | |
| 2017/0150844 A1 | 6/2017 | Hesselbrock et al. | |
| 2017/0215456 A1 | 8/2017 | Noth et al. | |
| 2017/0290354 A1 | 10/2017 | Pabst et al. | |
| 2018/0098556 A1 | 4/2018 | Cocchi et al. | |
| 2018/0303122 A1 | 10/2018 | Cocchi et al. | |
| 2018/0305115 A1 | 10/2018 | Bartoli et al. | |

FOREIGN PATENT DOCUMENTS

| | | |
|---|---|---|
| CN | 101617733 A | 1/2010 |
| CN | 103228152 A | 7/2013 |
| CN | 103796562 A | 5/2014 |
| CN | 103857617 A | 6/2014 |
| EP | 0285709 A1 | 10/1988 |
| EP | 2401945 A1 | 1/2012 |
| EP | 2478803 A1 | 7/2012 |
| EP | 2491792 A1 | 8/2012 |
| EP | 3058831 A1 | 8/2016 |
| EP | 3081093 A1 | 10/2016 |
| EP | 3127431 A1 | 2/2017 |
| EP | 3158872 A1 | 4/2017 |
| GB | 1362752 A | 8/1974 |
| WO | 2011042489 A1 | 4/2011 |
| WO | 2012036635 A1 | 3/2012 |
| WO | 2012104760 A1 | 8/2012 |
| WO | 2012160532 A1 | 11/2012 |
| WO | 2013019963 A2 | 2/2013 |
| WO | 2013041581 A1 | 3/2013 |
| WO | 2013188246 A2 | 12/2013 |
| WO | 2014029803 A1 | 2/2014 |
| WO | WO2015022678 A1 | 2/2015 |
| WO | 2015056188 A1 | 4/2015 |
| WO | WO2015092637 A1 | 6/2015 |
| WO | WO2015104610 A1 | 7/2015 |
| WO | 2015170174 A1 | 11/2015 |
| WO | 2016005112 A1 | 1/2016 |

OTHER PUBLICATIONS

Cocchi—U.S. Appl. No. 15/726,088, filed Oct. 5, 2017.
Cocchi—U.S. Appl. No. 15/647,830, filed Jul. 12, 2017.
Italian Search Report dated Oct. 24, 2017 from counterpart Italian App No. 201700043975.
Italian Search Report dated Sep. 14, 2015 for related Italian application No. BO20150179.
European Exam Report dated Sep. 26, 2017 from related European App No. 16164965.2.
Italian Search Report dated Apr. 20, 2016 for related Italian Application No. IT UB20155038.
Italian Search Report dated Apr. 20, 2017 from related Italian App No. IT 201600074471.
European Search Report dated Nov. 7, 2017 for related European Patent Application No. 17181161.5.
Italian Search Report dated Jun. 8, 2017 from related Italian App No. IT 201600100869.
Coffee Ice Cream NPL, https:noteatingoutinny.com/2007/04/14/fresh-coffee-premium-ice-cream/, p. 1-2. (Year: 2007).
Italian Search Report dated Apr. 19, 2016 from related Italian App No. UB20154199.
Chinese Office Action dated Nov. 21, 2019 for related Chinese Patent Application No. 201611048851.9.

MACHINE AND METHOD FOR MAKING LIQUID AND SEMI-LIQUID PRODUCTS OF THE ICE CREAM SECTOR

This application claims priority to Italian Patent Application 102017000043975 filed Apr. 21, 2017, the entirety of which is incorporated by reference herein.

BACKGROUND OF THE INVENTION

This invention relates to a machine and a method for making liquid and semi-liquid products of the ice cream sector (gelati, sorbets, soft ice cream, etc.).

As is known, a need which is strongly felt in this sector is that of being able to make ice cream type products in small portions very quickly and to a customer's individual request.

In effect, customers often demand to be able to have ice cream made on the spot to their specifications.

Patent document WO2015/092637, in the name of RDL Srl, describes a machine for preparing ice cream in individual portions and equipped with a batch freezing unit and a unit for loading a capsule.

A need which is felt particularly strongly by machine manufacturers is that of having a machine capable of making liquid and semi-liquid products of the ice cream sector in very small quantities (single portions) and which is particularly simple and reliable.

Another particularly strongly felt need in the sector in question is the need for a machine which allows reducing the risks of product contamination, thus increasing food safety.

SUMMARY OF THE INVENTION

The aim of this invention is to provide a machine and a method for making products of the ice cream sector, in particular ice cream, which allow satisfying the above mentioned need and, more specifically, a machine and a method which allow making small quantities of ice cream particularly easily based on the requirements expressed on the spot by the customer.

Another aim of the invention is to provide a machine and a method for making liquid and semi-liquid products of the ice cream sector and which allow reducing the risks of product contamination.

Yet another aim of the invention is to provide a machine and a method for making liquid and semi-liquid products of the ice cream sector and which allow making ice cream from liquid or semi-liquid concentrates.

A further aim of the invention is also to provide a machine and a method for making liquid and semi-liquid products of the ice cream sector and which constitute an effective alternative to the products of known type.

According to the invention, this aim is achieved by a machine and a method for making liquid and/or semi-liquid products of the ice cream sector and comprising the technical features set out in the present disclosure.

BRIEF DESCRIPTION OF THE DRAWINGS

The technical features of the invention, with reference to the above aims, are clearly described in the present disclosure and its advantages are apparent from the detailed description which follows, with reference to the accompanying drawings which illustrate a preferred, non-limiting example embodiment of the invention, and in which.

DESCRIPTION OF THE PREFERRED EMBODIMENTS

Figure 1A:
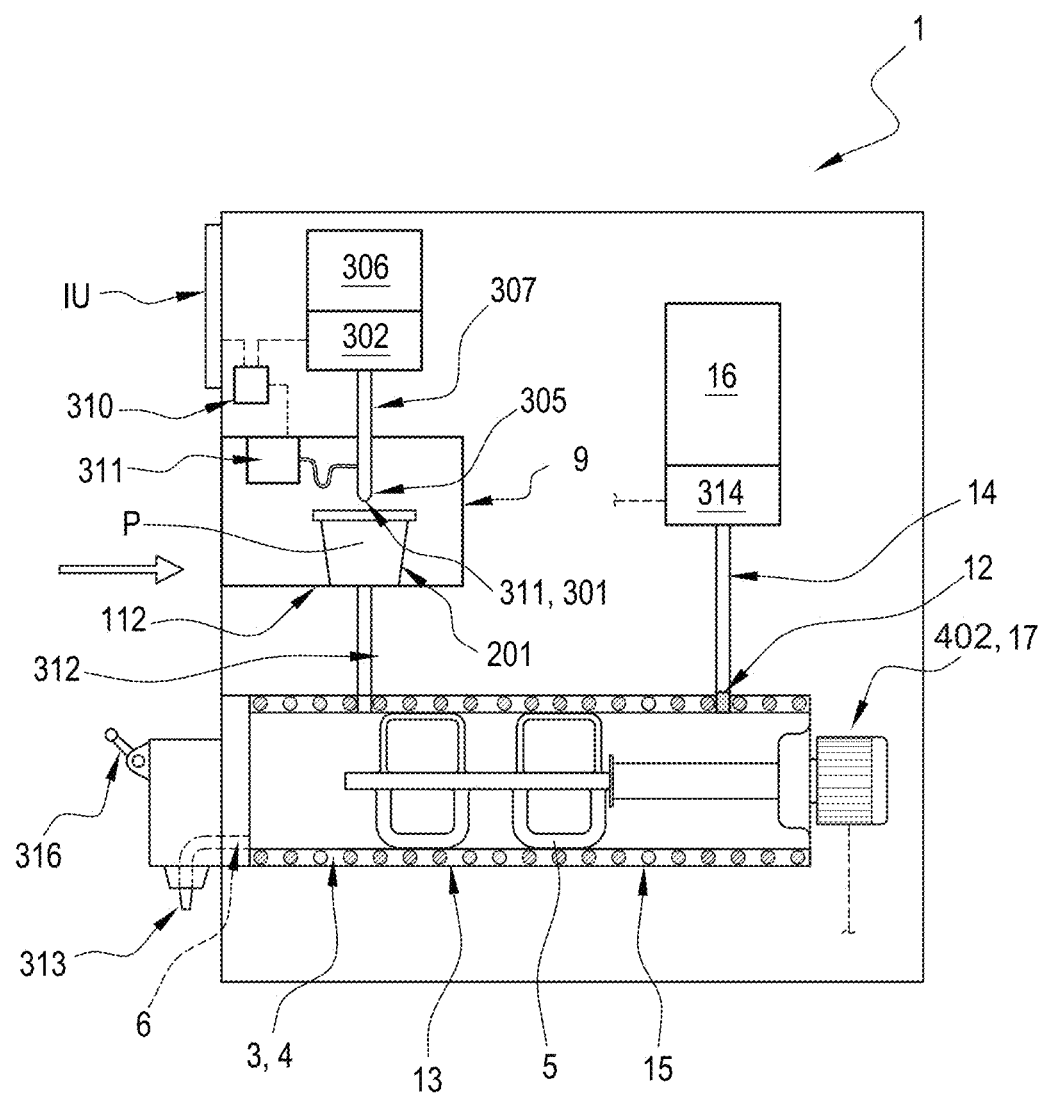
FIG. 1A is a schematic view of a machine according to this invention.

With reference to the accompanying drawings, the numeral 1 denotes a machine for making liquid and/or semi-liquid products of the ice cream sector (that is, products such as artisan gelato, sorbet, soft ice cream, etc.).

It should be noted that the machine 1 is, preferably, designed to make cold products of the ice cream sector (gelato, soft ice cream).

By "gelato" or "ice cream" is meant a food preparation obtained from mixtures of ingredients which are brought to the consistency of a cream or paste and to the consumption temperature by (rapid) cooling and simultaneous stirring to allow a (moderate) quantity of air to be incorporated therein.

Generally speaking, there are ice creams based on milk and/or cream and ice creams based on fruit, sugars and water, called sorbets.

Preferably, the machine 1 is an ice cream machine, designed to make ice cream (preferably artisan gelato).

In the context of the invention, the term "ice cream" is used to mean a food preparation which is based on milk or milk-derived products and to which fruit, aromatics or other ingredients are added to obtain different flavors.

This disclosure describes an ice cream machine 1 comprising:

a batch freezing unit having:
- a processing container 3 forming a processing chamber 4 for making an ice cream product;
- a stirrer 5 mounted inside the processing chamber 4;
- a motor 402 operatively coupled to the stirrer 5 to drive it in rotation;
- a cooling system 13 equipped with at least one heat exchanger 15 associated with the processing container 3, for exchanging heat with the container 3 and cooling the processing container 3;
- a unit 9 for receiving a capsule 201 containing a basic preparation P for an ice cream product and comprising a seat 112 for loading the capsule 201;
- a device 12 for injecting a dilution liquid, associated with the processing container 3, for injecting the dilution liquid into the processing container 3;

an injection device 301 for injecting an extraction liquid or a mixture containing an extraction liquid, and which is associated with the receiving and treating unit 9 to feed the extraction liquid or mixture into the capsule 201 to allow extracting the product from the interior of the capsule 201.

It should be noted that the mixture containing an extraction liquid may also comprise a component in the gaseous state (for example, air, carbon dioxide, nitrogen).

Thus, the mixture may comprise an extraction liquid and a gas, that is to say, it may comprise at least two components: one in the liquid state and one in the gaseous state.

The machine 1 preferably comprises a first regulating device 302 for regulating the temperature of the extraction liquid or mixture containing an extraction liquid and which is configured to heat and/or cool the extraction liquid or mixture containing the extraction liquid in such a way as to keep it at a predetermined temperature.

According to another aspect, the machine 1 comprises a tank 306 for storing the extraction liquid or mixture containing the extraction liquid, and a duct 307 for connecting the storage tank 306 to the injection device 301.

It should be noted that the first temperature regulating device 302 is preferably associated with the tank 306 to keep the extraction liquid or mixture containing the extraction liquid at a predetermined temperature.

Preferably, the extraction liquid or mixture containing an extraction liquid comprises water.

Alternatively, the extraction liquid or mixture containing an extraction liquid is a water-based mixture.

In another embodiment, the extraction liquid or mixture containing an extraction liquid also comprises a gaseous portion which is added to the liquid phase.

It should be noted that, advantageously, in the case of a concentrated basic product (in particular, liquid or semi-liquid), the extraction liquid or mixture containing an extraction liquid allows extracting the concentrate from the capsule 201 completely.

In this case, however, the actual mixing takes place inside the container 3, with the dilution liquid, as described further on.

According to another aspect, the regulating device 302 is configured to regulate the temperature of the extraction liquid or mixture containing an extraction liquid to a predetermined temperature of between 5° C. and 85° C.

According to another aspect, the regulating device 302 comprises a heater adapted to heat the extraction liquid or mixture containing an extraction liquid.

According to another aspect, the regulating device 302 comprises a heater adapted to heat the extraction liquid or mixture containing an extraction liquid to a temperature between 30° and 85° C.

According to another aspect, the regulating device 302 comprises a heater adapted to heat the extraction liquid or mixture containing an extraction liquid to a temperature between 35° and 60° C.

It should be noted that the heated extraction liquid or heated mixture containing an extraction liquid (in particular, heated to a temperature higher than ambient temperature) advantageously allows transferring the basic product particularly effectively to the container 3, that is to say, it allows extracting the basic product P from the capsule 201 to transfer it to a successive duct 312 (the duct 312 leads directly into the container 3).

It should be noted that according to another aspect, the seat of the capsule 201 is connected to the container 3 by means of a duct 312.

According to another aspect, the regulating device 302 comprises a cooling device configured to cool the extraction liquid or mixture containing an extraction liquid to a temperature between 5° and 15° C.

According to another aspect, the machine 1 comprises a control unit 310 connected to the temperature regulating device 302 to control it and regulate the temperature of the extraction liquid or mixture containing an extraction liquid.

According to yet another aspect, the machine 1 comprises a user interface IU connected to the control unit 310 and provided with controls to allow selecting a type of liquid or semi-liquid product from a list of possible products contained in the capsule 201.

According to one aspect, the user interface IU is configured to send to the control unit a signal relating to the selection made so as to control the temperature regulating device 302 and regulate the temperature of the extraction liquid or mixture containing an extraction liquid as a function of the signal relating to the selection made.

In other words, the temperature of the extraction liquid or mixture containing an extraction liquid is regulated to a first temperature as a function of the selection made.

According to one aspect, the user interface IU is configured to send to the control unit a signal relating to the selection made so that the control unit regulates the quantity of extraction liquid delivered as a function of the selection made.

It should be noted that according to this aspect, an optimal quantity of extraction liquid for the basic product P contained in the capsule 201 is delivered into the capsule 201.

According to another aspect, the machine 1 comprises a scanning device for reading an information code associated with the capsule 201 and being operatively connected to the control unit 310 to send an item of information from the information code scanned.

According to this aspect, the control unit 310 is also configured to control the temperature regulating device 302 based on the item of information from the information code so as to regulate the temperature of the extraction liquid or mixture containing an extraction liquid.

It should be noted that in one embodiment, the information code may comprise a graphic and/or alphanumeric code on the surface of the capsule 201 and, in a different embodiment, an RFID code (associated with the capsule 201).

According to another aspect, the unit 9 for receiving a capsule 201 comprises injection means 311 for injecting a pressurized gaseous fluid (at a pressure greater than atmospheric pressure) and configured to inject a pressurized gaseous fluid into the capsule 201 so as to assist the extraction of the basic preparation P from the capsule 201 and its transfer to the processing container 3.

Preferably, the gaseous fluid is a gas.

Preferably, the gaseous fluid is air.

Preferably, the gaseous fluid is nitrogen.

Preferably, the gaseous fluid is carbon dioxide.

According to another aspect, the unit 9 for receiving and treating a capsule 201 comprises a movable loading element 101 having a seat 112 for loading the capsule 201, the movable loading element 101 being movable between an extracted position for loading the capsule 201 and an inserted position for inserting the capsule 201.

According to yet another aspect, the receiving and treating unit 9 comprises an element 315 of contact with an upper wall 208 of the capsule 201 which is movable between a spaced-apart position where it is spaced from the capsule 201 and a contact and compression position where it compresses the upper wall 208 of the capsule.

According to yet another aspect, the unit 9 for receiving the capsule 201 comprises an actuator 107 operatively coupled to the contact element 315 to move it between the spaced-apart position and the contact and compression position.

Preferably, the injection device 301 for injecting an extraction liquid or a mixture containing an extraction liquid comprises an injection element 311 configured to make a fluid coupling with an internal cavity 205 in the capsule 201.

Preferably, the container 3 is between 156,000 mm$^3$ and 1,962,600 mm$^3$ in volume.

Preferably, the machine also comprises serving means 6 (for serving the finished product), operating at the processing chamber 4 for delivering the (finished) product to the outside of the processing chamber 4.

In FIG. 1A, the serving means 6 comprise a valve and a duct 313 for delivering the product and connected to the internal space in the container 3. The valve operates on the product delivery duct 313 to open/close it.

The machine may also comprise a lever 316 to open or close the valve operating on the duct 313.

It should be noted that the stirrer 5 is adapted to be driven in rotation to allow mixing the basic product (transferred from the capsule into the processing chamber 4) with the dilution liquid inside the processing chamber 4.

Preferably, the machine 1 also comprises a device 314 for regulating the temperature of the dilution liquid.

The device 314 may comprise a heater or a cooling device.

According to one aspect, the device 314 may regulate the temperature of the dilution liquid between 1° and 35° C.

According to one aspect, the device 314 is preferably associated with a tank 16 for containing the dilution liquid Preferably, the containment tank 16 is connected to the processing container by a pipe 14.

Preferably, the device 12 for injecting a dilution liquid is located at one end of the pipe, distal from the tank 16.

Preferably, the device 314 for regulating the temperature of the dilution liquid and the device 302 for regulating the temperature of the extraction liquid or mixture containing an extraction liquid are configured to regulate the temperatures of the extraction liquid (or mixture containing an extraction liquid) to two different temperatures.

More specifically, the device 302 for regulating the temperature of the extraction liquid or mixture containing an extraction liquid is configured to regulate the temperature of the extraction liquid or mixture containing an extraction liquid to a first temperature value.

Further, the device 314 for regulating the temperature of the dilution liquid is configured to regulate the temperature of the dilution liquid to a second temperature value.

Preferably, the first temperature value is different from the second temperature value.

It should be noted that the dilution liquid and the extraction liquid (or mixture containing an extraction liquid) may be identical (that is, may have the same chemical composition) or different.

As to the proportions (by weight or by volume) between the extraction liquid fed in and the dilution liquid in order to prepare a portion of ice cream, it is noted that the ratio between the extraction liquid and the dilution liquid is preferably less than 1:100.

Preferably, the ratio between the extraction liquid and the dilution liquid (by weight or by volume) is less than 1:50.

Still more preferably, the ratio between the extraction liquid and the dilution liquid (by weight or by volume) is less than 1:25.

Still more preferably, the ratio between the extraction liquid and the dilution liquid (by weight or by volume) is less than 1:10.

Still more preferably, the ratio between the extraction liquid and the dilution liquid (by weight or by volume) is less than 1:5.

Still more preferably, the ratio between the extraction liquid and the dilution liquid (by weight or by volume) is less than 1:4.

It should be noted that according to the invention, mixing the basic product, that is, the one contained in the capsule 201, with the dilution liquid takes place inside the container 3: the extraction liquid (or mixture containing an extraction liquid) has the sole function of allowing all the basic product to be extracted from the capsule 201 (to be transferred into the container 3).

Figure 1B:
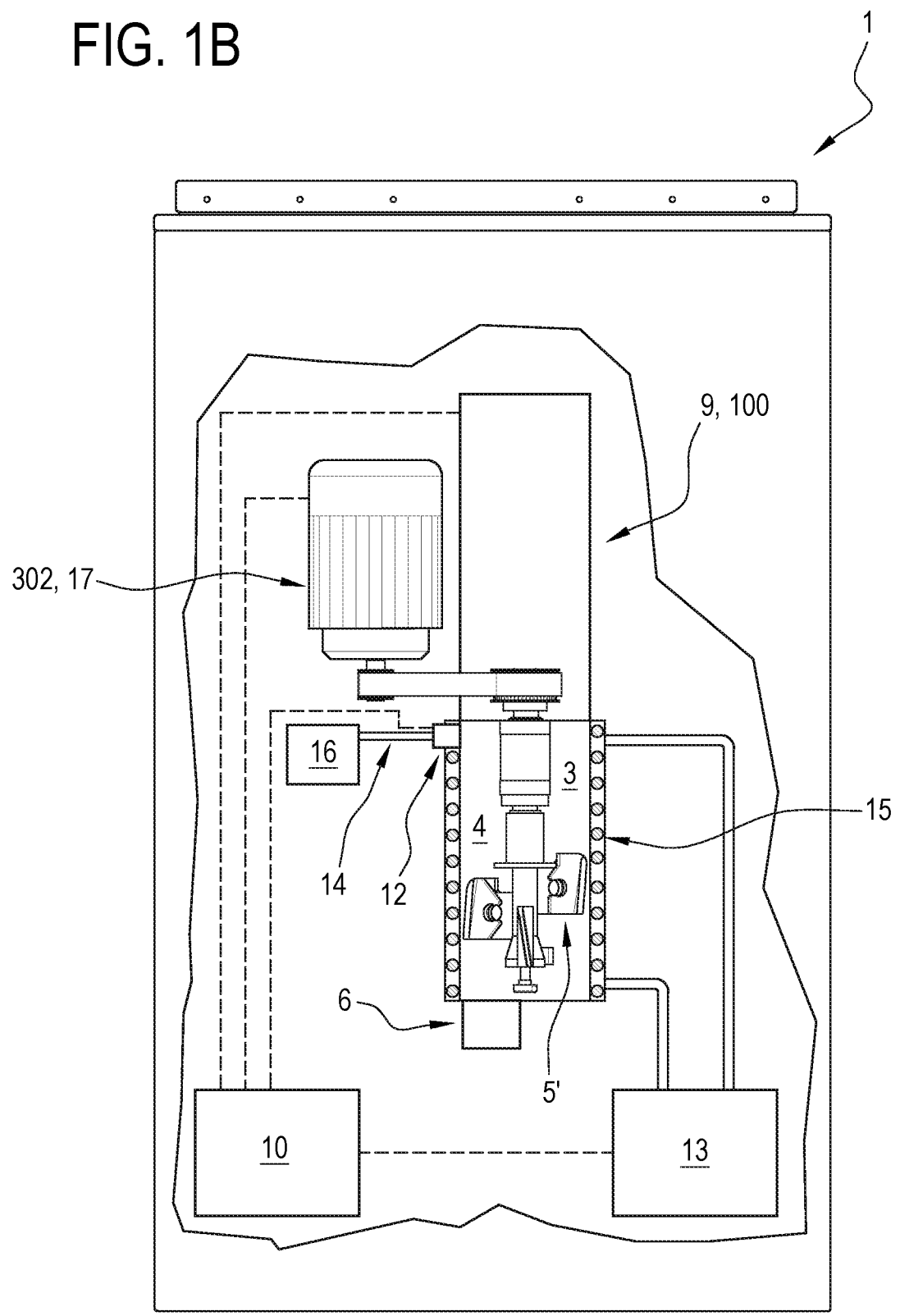
FIG. 1B is a view of a machine according to this invention.
Figure 2:
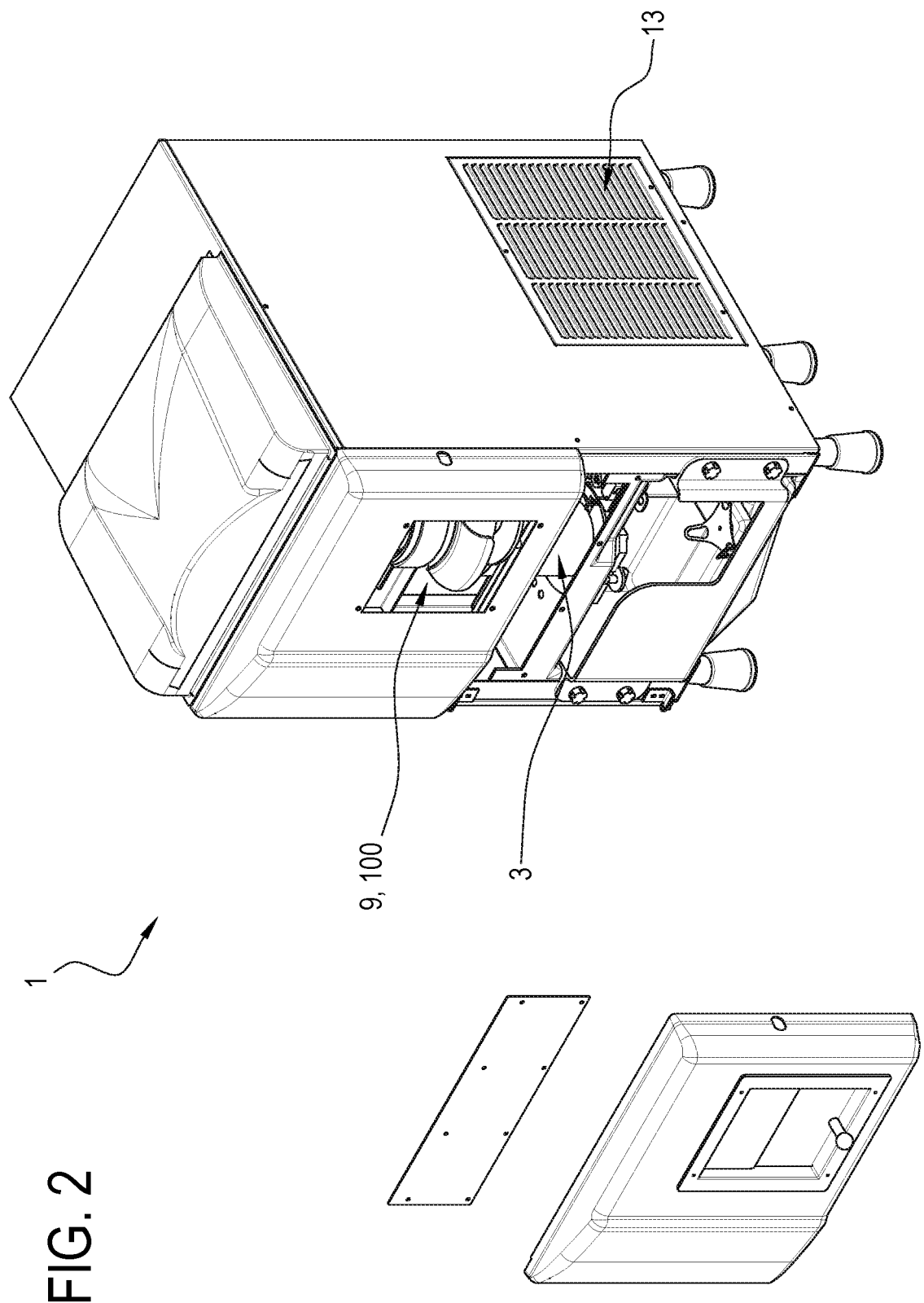
FIG. 2 is a schematic perspective view of a machine according to this invention.

Described below is the machine illustrated in FIG. 1B, which integrates one or more of the technical and functional features described in the foregoing.

Preferably, the machine 1 comprises an actuator 17 (drive motor) to drive the stirrer 5 in rotation.

Preferably, the dimensions of the processing container 3 are such as to allow it to hold a portion of finished product (for example, ice cream) of between 45 g and 450 g, and more preferably, between 70 g and 250 g.

Preferably, the container 3 is cylindrical in shape.

Preferably, the container 3, cylindrical in shape, has a vertical axis.

In a different embodiment not illustrated, the container 3, cylindrical in shape, has a horizontal axis.

Preferably, the container 3 is between 40 and 110 mm in diameter.

Still more preferably, the container 9 is between 75 and 240 mm in (axial) length.

Preferably, the container 9 is between 94,200 $mm^3$ and 2,279,640 $mm^3$ in volume.

It should be noted that the machine 1 is preferably adapted to process a single portion of product.

With reference to the capsule 201, it should be noted that the capsule 201 may contain one or more liquids, or one or more powders, or a granulate, or a gel, or a concentrate, defining a basic preparation for the ice cream type product.

Preferably, the capsule 201 contains a liquid or semi-liquid product.

Still more preferably, the capsule 201 contains a concentrated (liquid or semi-liquid) product.

It should be noted that the device 9 for receiving the capsule 201 is positioned preferably above the container 3, that is, above the processing chamber 4.

According to another aspect, the device 12 for injecting a dilution liquid is configured to deliver water or a water-based mixture so as to allow diluting the basic preparation in the capsule with water or a water-based mixture.

According to another aspect, the device 12 for injecting a dilution liquid is configured to deliver a milk-based mixture (and water if necessary): that is to say, the dilution liquid is a milk-based mixture (and water if necessary).

Alternatively, the device 12 for injecting a dilution liquid is configured to deliver milk or a milk-based mixture so as to allow diluting the basic preparation in the capsule with milk or a milk-based mixture.

More generally speaking, the device 12 for injecting a dilution liquid is adapted to deliver a dilution liquid or a mixture of two or more different types of liquid.

It should be noted that the injection device 12 is connected directly to the container 3 to deliver the dilution liquid into the container 3.

Preferably, the injection device 12 also comprises a tank 16 for containing the dilution liquid.

The injection device 12 preferably further comprises a transfer pump (not illustrated) for transferring the dilution liquid from the tank 16 containing it to the point of delivery/dilution (where the dilution liquid is delivered and mixed with the basic preparation).

It should be noted that the device 12 for injecting a dilution liquid is advantageously associated with the processing chamber 4, that is, with the container 3.

More precisely, the device 12 for injecting a dilution liquid releases the dilution liquid into the container 3.

Further, according to another aspect, the device 12 for injecting a dilution liquid may comprise a duct connected to a water supply (not illustrated).

According to this aspect, the injection device 12 preferably comprises one or more valves which can be turned on or off to make or break the connection with the water supply.

According to this aspect, the dilution liquid is delivered (directly) into the processing chamber 4: thus, the injection device 12 is configured to deliver the dilution liquid into the processing chamber 4.

Preferably, the heat exchanger 15 is wound in a coil on the walls of the cylindrical container 3.

Preferably, the processing container 3 is provided with a door (at the bottom) for cleaning, and/or extracting the product from, the processing chamber 4.

A mixing and simultaneous thermal cooling treatment step is carried out inside the processing container 3 so as to convert the basic preparation, diluted with the dilution liquid, into the finished product (for example, an ice cream type product).

It should be noted that this step is extremely rapid (in the order of minutes, preferably less than 180 s and still more preferably, less than 120 s).

It should be noted that during the stirring and simultaneous thermal treatment step, the basic preparation P (diluted with the dilution liquid) is thermally treated at a temperature between −15° C. and −2° C.

Thus, the cooling means 13 are configured to cool the basic preparation P (diluted with the dilution liquid) inside the container 3 down to a temperature between −15° C. and −2° C. and, more preferably, between −13° C. and −3° C.

The control and drive unit 10 is thus configured to regulate the cooling system 13 in such a way as to enable the mixture being processed inside the container 3 to be cooled to a temperature in a range between −15° C. and −2° C. and, more preferably, between −13° C. and −3° C.

It should be noted that the refrigeration system 13 preferably comprises a compressor and a hydraulic circuit (which the compressor is connected to) containing a heat exchanger fluid.

The heat exchanger 15 associated with the container 3 is configured to allow heat exchange between the heat exchanger fluid and the basic preparation P (diluted with the dilution liquid) inside the container 3.

It should be noted that the heat exchanger 15 associated with the container 3, in cooling during normal use, acts as an evaporator.

Preferably, the refrigeration system 13 comprises a further exchanger (condenser), not illustrated.

Preferably, the refrigeration system 13 comprises a pressure reducing (throttle) element.

Preferably, the refrigeration system 13 is configured to operate according to a thermodynamic cycle, preferably a vapor compression cycle.

With reference to the capsule 201, it should be noted that the capsule 201 has a top wall 208, or covering element, a bottom wall 203, or base wall, and a side wall 204 connecting the top wall to the bottom wall.

The capsule 201 is specified in more detail below in a description which must be considered as non-limiting, meaning that the machine of this invention and the method implemented by it can also use capsules of a different kind.

The capsule walls enclose an internal space or cavity 205 containing one or more basic products defining the basic preparation P.

As illustrated in FIG. 1, the machine 1 comprises a storage tank 16 for the basic liquid, and a connecting duct 14 connecting the storage tank 16 to the injection device 12.

With reference to the serving means 6 (for serving the finished product), it should be noted that the serving means 6 may be operated manually or automatically.

It should be noted that the machine 1, using capsules 201, advantageously allows making very small quantities of ice cream in very short spaces of time (to the customer's specifications and taste).

Furthermore, with reference to the advantages of the invention, it should be stressed that the machine 1 avoids the need to handle the food product, thus substantially minimizing the risk of contamination.

Thus, a food product of particularly high quality can be guaranteed.

Further, the machine according to this invention can be cleaned in a particularly quick and easy manner (using a "cleaning-in-place" procedure). Moreover, the machine 1 of the invention has a particularly reduced footprint, which means that shop floor space can be optimized.

The advantages of the machine 1 of the invention also include a reduced impact on the environment and reduced maintenance requirements.

Described in more detail below is the dispensing assembly 100, illustrated in FIG. 3: some advantages can be inferred from this description.

Figure 3:
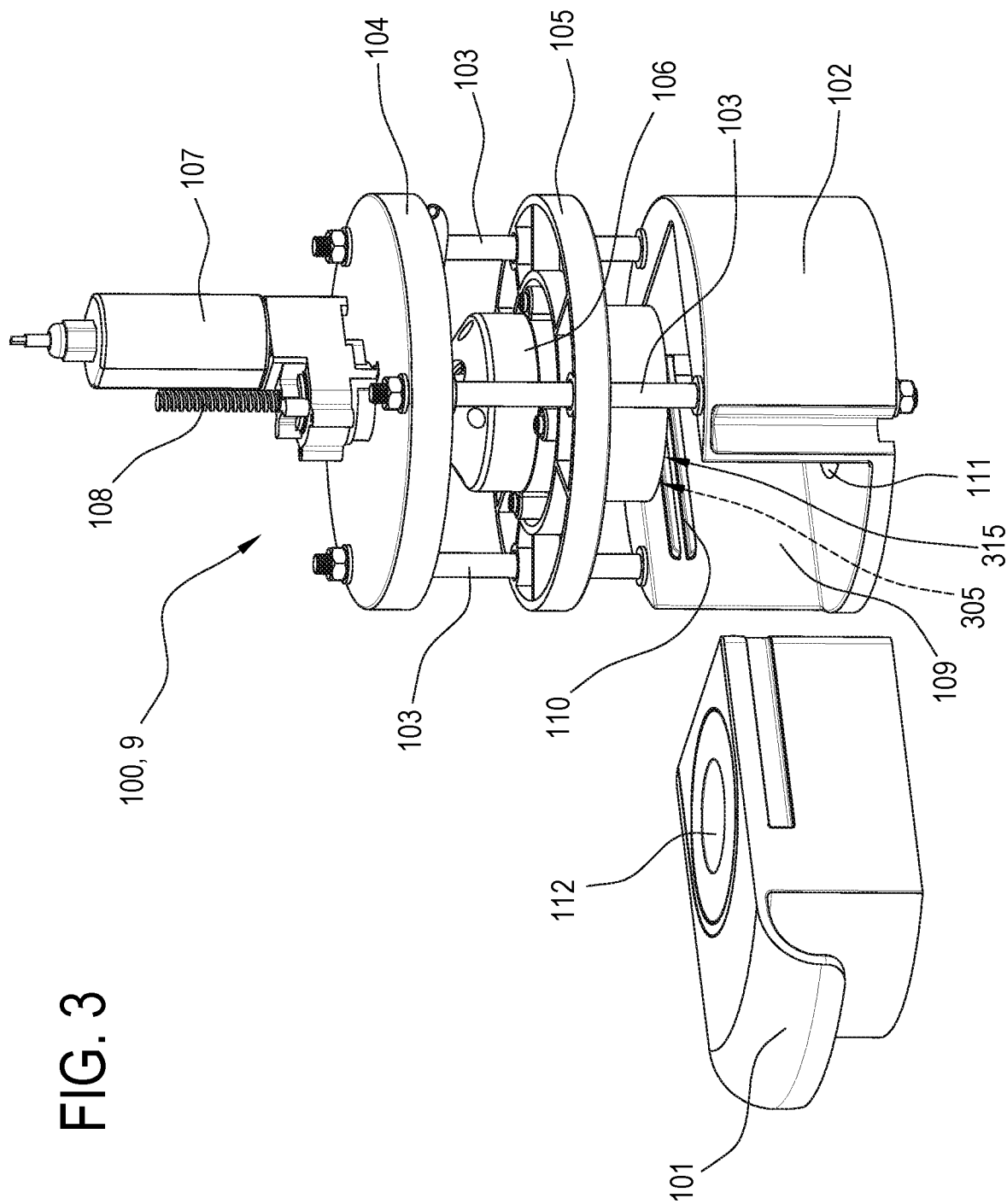
FIGS. 3 to 6 illustrate a device for loading and treating a capsule forming part of the machine of FIG. 1B.
Figure 4:
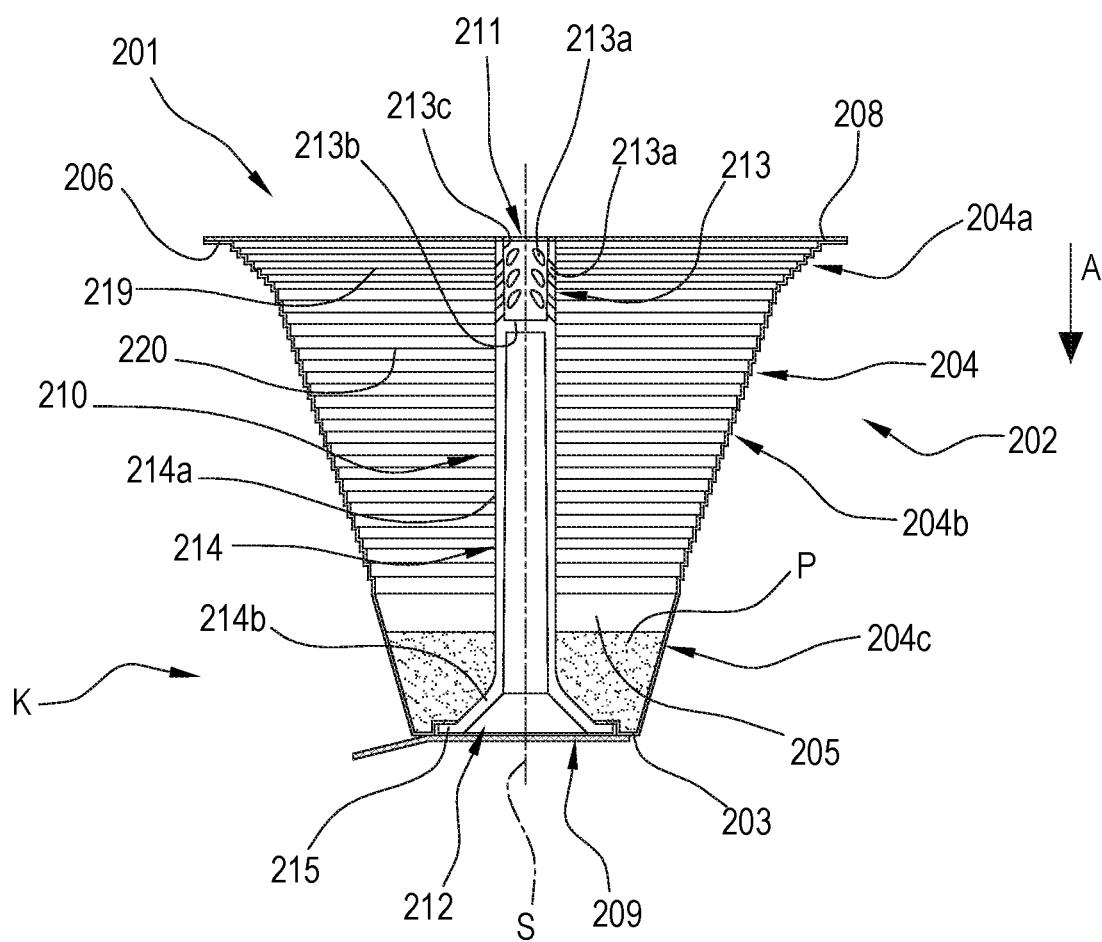

FIG. 3 illustrates a dispensing assembly 100 by which a food preparation P, contained in a capsule 201, is dispensed and used to make an ice cream, (FIG. 4).

The dispensing assembly 100 comprises a base 102 which supports a plurality of columns 103 fixed at the bottom to the base 102 and at the top to a fixing element 104, for example in the shape of a disc.

The dispensing assembly 100 also comprises a dispensing unit 106 which is configured to inject an extraction liquid or a mixture containing an extraction liquid (into the capsule 201) through the injection device 301 (not shown).

In other words, the dispensing unit 106 comprises the injection device 301.

Preferably, the dispensing assembly 100 is configured to compress a capsule 201 to allow dispensing the food product P which is contained in the capsule 201.

The dispensing unit 106 is mounted above a compartment 109 used to house a drawer element 101 (which, more generally speaking, defines a capsule loading element 101) equipped with a housing 112 designed to hold a capsule 201.

According to one aspect, the capsule 201 is compressible and squeezable.

The capsule 201 contains the product P to be dispensed, for example a product in powder, liquid or paste form.

The drawer element 101 may be inserted into the compartment 109, or extracted therefrom, by making it slide on guides 110 provided in the compartment 109.

On the bottom of the compartment 109, there is an opening 111 through which the product P is sent to the batch freezing device of the ice cream making machine (that is, to the container 3).

The dispensing unit 106 is fixed to a supporting element 105 slidably coupled to the columns 103.

The supporting element 105 is connected to a threaded shaft 108 which is driven by an actuator 107 to rotate and slide in a direction parallel to the columns 103, that is, in a vertical direction, in such a way as to move the dispensing unit 106 up or down along the columns 103.

In other words, the dispensing unit 106 is driven by a lead nut and screw mechanism or device.

It should be noted that the injection device 301 is preferably supported by, or coupled to in such a way as to be movable as one with, the supporting element 105

When it is moved down, the dispensing unit 106 preferably compresses the capsule 201 inside the housing 112 of the drawer element 101, causing the food preparation P to be extracted from the capsule 201 and delivered through the hole 111 to the batch freezing device.

Figure 5:
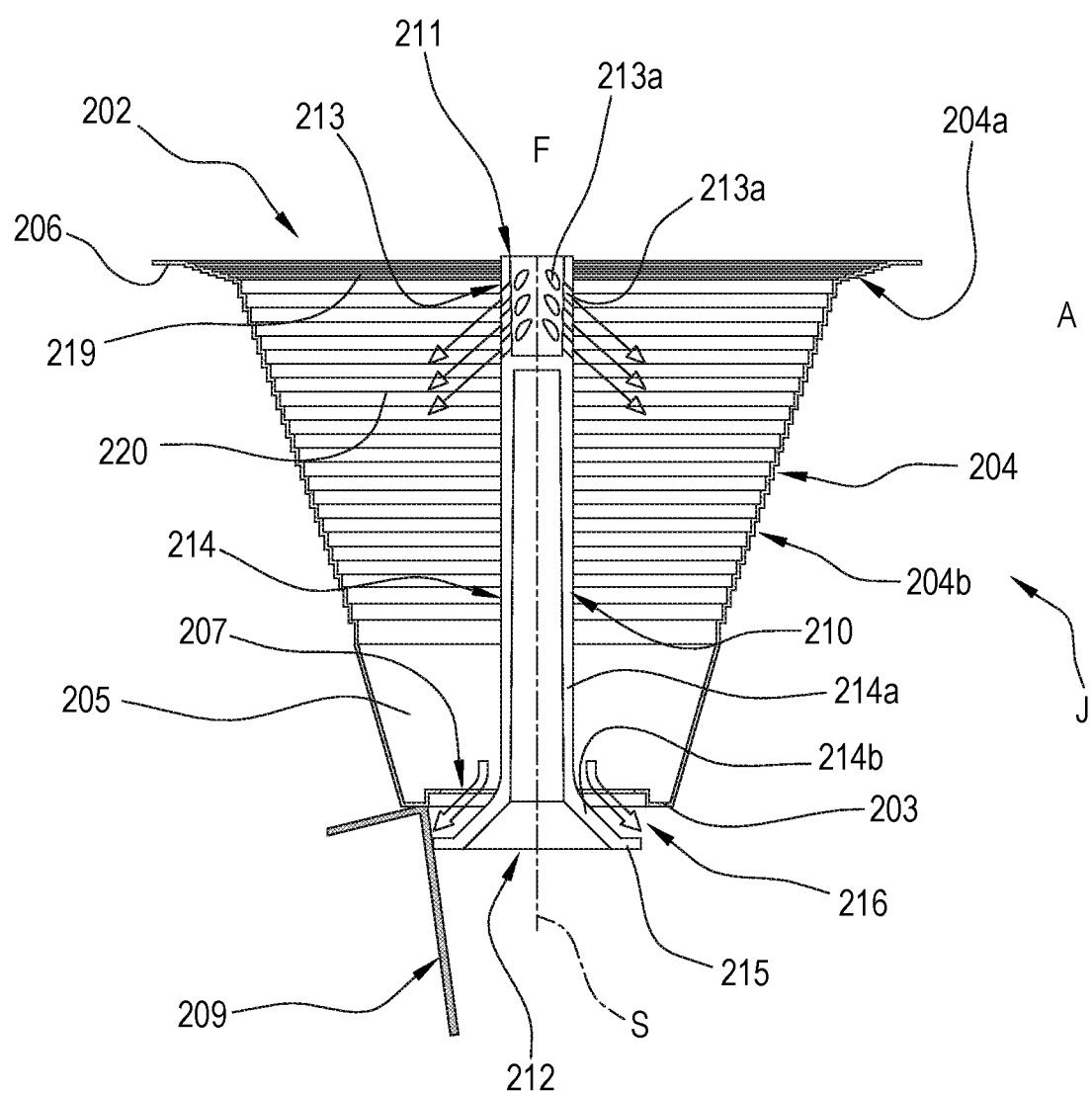

Described below by way of non-limiting example is an embodiment of the capsule 201, illustrated in FIGS. 4 to 6.

The capsule 201 comprises a case 202 which includes a base wall 203 and a side wall 204 defining a cavity 205 for containing the food preparation P and an edge 206 in the form of a flange extending from the side wall 204.

The side wall 204 is deformable along predefined lines of compliance 219, 220 to allow the case 202 to be compressed along a direction A transverse to the base wall 203.

The side wall 204 of the capsule comprises a first zone 204a contiguous to the flanged edge 206 and provided with a first group of first lines of compliance 219, a second zone 204b contiguous with the first zone 204a and provided with a second group of second lines of compliance 220 and a third zone 204c extending from the second zone 204b to the base wall 203 and optionally provided with a third group of third lines of compliance (not illustrated).

The first lines of compliance 219, the second lines of compliance 220 and, optionally, the third lines of compliance are parallel to each other and parallel to the base wall 203 of the capsule 201 to allow the case 202 to be compressed along the direction transverse to the base wall 203.

The base wall 203 comprises an outlet opening 207 to let the food preparation P out of the capsule 201.

The capsule 201 also comprises a covering element 208 fixed to the flanged edge 206 in order to hermetically seal the cavity 205 and a closing element 209 fixed in a partly detachable manner at least to the base wall 203 in order to hermetically seal the outlet opening 207.

A nozzle 210, through which the extraction liquid (or the mixture containing an extraction liquid) can be injected into the cavity 205, is fixed to the cover element 208.

The nozzle 210 comprises a first, hollow portion 213, which is positioned to receive the injection device 301 for injecting the extraction liquid (or the mixture containing an extraction liquid) and comprises a plurality of openings 213a for feeding the extraction liquid (or mixture containing an extraction liquid) F from the injection means to the cavity 205.

The injection device 301 for injecting the extraction liquid (or mixture containing an extraction liquid) is inserted into the first portion 213 through a first end 211 of the nozzle 210.

The nozzle 210 also comprises a second portion 214 which includes a second end 212, extends through the outlet opening 207 and comprises a first, tubular stretch 214a with constant cross section, and a second stretch 214b which is shaped relative to the first stretch 214a and terminates with an outer flange 215 which peripherally surrounds the second end 212 and closes the outlet opening 207 when the capsule 201 is in a first, non-deformed configuration K (FIG. 4).

The outer flange 215 of the nozzle 210 is configured to push the closing element 209 outwards to open the capsule 201 when the capsule 201 is compressed to pass from the first configuration K to a second, deformed configuration J (FIG. 3).

Figure 6:
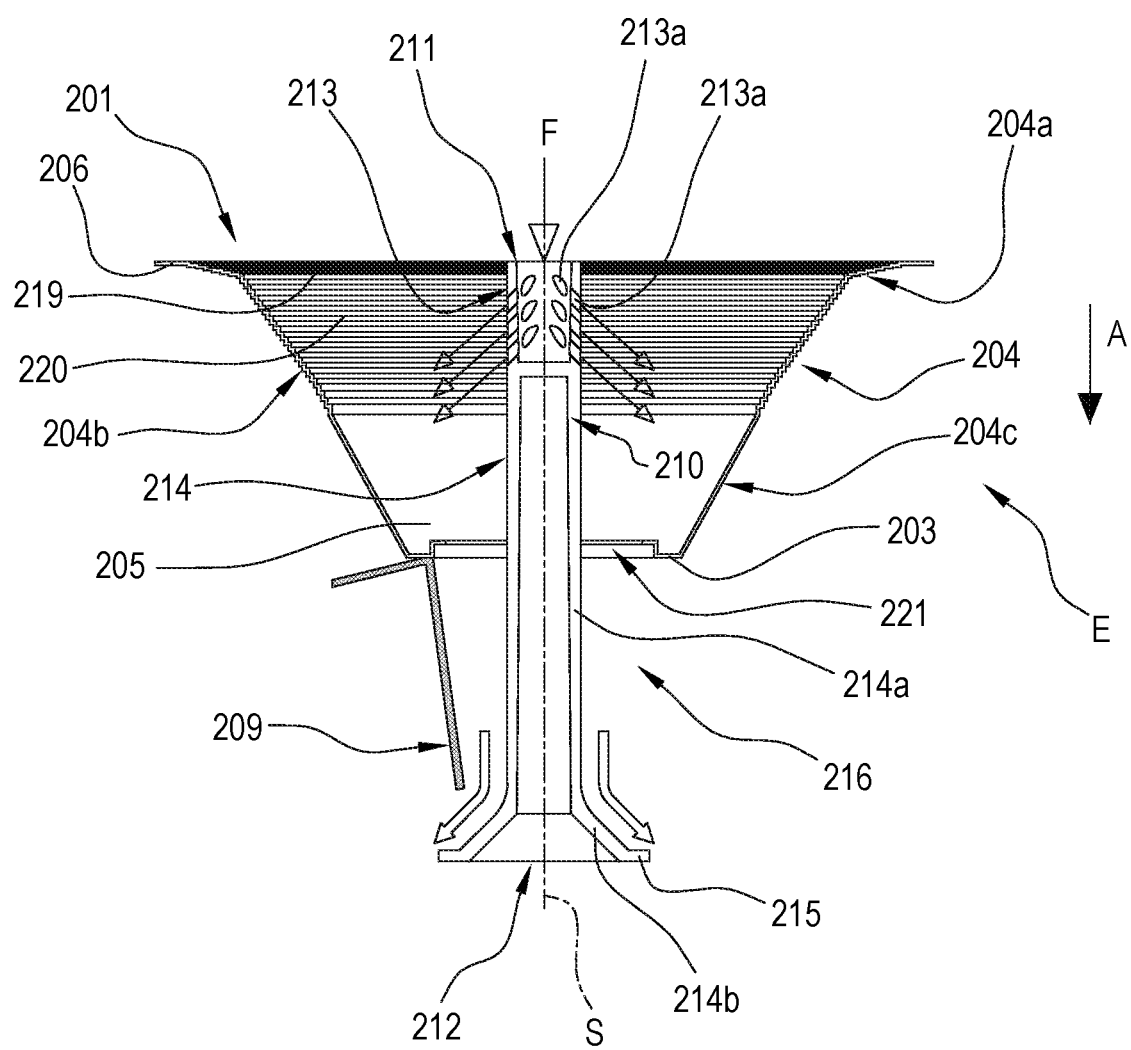

The second stretch 214b of the nozzle 210 is made to protrude from the base wall 203 of the capsule 201 when the capsule 201 is further compressed and passes from the second configuration J to a third, further deformed configuration E (FIG. 6). Further, the second stretch 214b of the nozzle 210 is divergent in shape in such a way as to guide the food preparation P outwards as it is squeezed out of the outlet opening 207 by the pressurized fluid when the capsule 201 is in the configuration J or in the third configuration E.

To dispense the food product P from the capsule 201 and transfer it to the batch freezing device, the capsule 201 is inserted into the housing 112 of the drawer 101 of the dispensing assembly 100 and the drawer 101 is in turn inserted into the compartment 109 located under the dispensing unit 106.

After inserting the drawer 101 with the capsule 201 in it into the compartment 109, the actuator 107 is activated to move the dispensing unit 106 down until the injection device 301 pierces the covering element 208 and is received in the first portion 213 of the nozzle 210. As it continues moving down, the dispensing unit 106 starts squeezing the case 202 of the capsule 201.

In a first step of squeezing the case 202, the nozzle 210 slides into the outlet opening 207 and the outer flange 215 pushes the closing element 209 outwards in such a way as to detach the closing element 209 itself at least partly.

At the same time, the side wall 204 is compressed at the first zone 204a thanks to the first lines of compliance 219, which are moved close together. That way, the volume of the case 202 is reduced, as shown in FIG. 5, because the capsule 201 passes from the first, non-deformed configuration K to the second, compressed configuration J.

The nozzle 210 protrudes from the base wall 203 by a limited amount and an annular opening 216 is formed between the base wall 203 and the second portion 214 of the nozzle 210 to let the food preparation P start coming out of the capsule 201.

In the first squeezing step, the annular opening 216 is reduced in size but detaching the closing element 209, even if partly, places the cavity 205 in communication with the outside atmosphere through the annular opening 216.

During the first squeezing step, the injection device 301 starts injecting the extraction liquid (or mixture containing an extraction liquid) into the cavity 205 in order to assist the extraction of the product P from the capsule 201.

In a second step of squeezing the case 202, the whole of the second stretch 214b of the second portion 214 of the nozzle 210 protrudes beyond the base wall 203 of the capsule 201 when the capsule 201 is further compressed.

The side wall 204 is compressed at the second zone 204b thanks to the second lines of compliance 220.

That way, the volume of the case 202 is further reduced, as shown in FIG. 6, because the capsule 201 passes from the second configuration J to a third and final, compressed configuration E, where the capsule 201 is further deformed and its volume is at its minimum.

During the second squeezing step, the injection device 301 continues injecting the extraction liquid (or mixture containing an extraction liquid) in order to complete dispensing of the product P to the batch freezing device.

When dispensing of the product P is finished, the dispensing unit 106 moves back up to its starting position so that the drawer 101 can be extracted from the compartment 109 and the used capsule 201 can be removed by simply turning the drawer upside down.

According to another aspect, more generally speaking, the unit 9 for receiving and treating the capsule 201 comprises a seat 112 for loading the capsule 201 and a dispensing unit 106 equipped with at least one element of contact with an upper wall 208 of the capsule 201 which is movable between a spaced-apart position where it is spaced from the capsule 201 and a contact and compression position where it compresses the upper wall 208 of the capsule.

Preferably, the injection device 301 comprises an element for distributing an extraction liquid (or mixture containing an extraction liquid) and configured to establish a fluid connection with an internal cavity 205 of the capsule 201 and the dispensing unit 106 supports the extraction liquid distribution element (movably between the spaced-apart position and the contact and compression position).

Clearly, the method for extracting the product may differ with different types of capsule: for example, extraction may be accomplished without compression and the capsule not compressed until after the product has been extracted.

Whatever the case, the injection device 301 is coupled to the internal cavity of the capsule 201 to allow the extraction liquid to be delivered into the capsule so that the basic product P can be extracted from the capsule 201.

According to another aspect, also defined is a method for making ice cream in portions (and which can be implemented by a machine according to the present disclosure), comprising the follows steps:
  preparing a capsule 201 containing a basic preparation;
  feeding an extraction liquid or a mixture containing an extraction liquid into the capsule 205;
  opening the capsule 201;
  transferring the basic preparation P and the extraction liquid (or mixture containing an extraction liquid) from the capsule 201 into the container 3;
  feeding a dilution liquid into the container 3;
  stirring and mixing the basic preparation P, the extraction liquid (or mixture containing an extraction liquid) and the dilution liquid by means of the stirrer 5, and simultaneously cooling the basic preparation P and the dilution liquid to a temperature between −2° C. and −15° C. so as to make a portion of ice cream.

According to another aspect, the method further comprises, before the step of feeding an extraction liquid (or mixture containing an extraction liquid) into the capsule 201, a step of regulating the temperature of the extraction liquid (or mixture containing an extraction liquid) to a predetermined temperature.

According to another aspect, the step of regulating the temperature of the extraction liquid (or mixture containing an extraction liquid) to a predetermined temperature comprises a step of selecting the temperature based on a command issued by a user or a reading of an information code associated with the capsule 201.

According to another aspect, the temperature of the extraction liquid (or mixture containing an extraction liquid) is different from the temperature of the dilution liquid.

According to yet another aspect, the method comprises a step of heating or cooling the extraction liquid (or mixture containing an extraction liquid) in order to regulate the temperature of the extraction liquid (or mixture containing an extraction liquid) to a first temperature value.

According to yet another aspect, the method comprises a step of heating or cooling the dilution liquid in order to regulate the temperature of the dilution liquid to a second temperature value.

According to another aspect, the method comprises a step of injecting a pressurized gaseous fluid (gas, preferably air) into the cavity 205 of the capsule 201 to assist the extraction of the basic preparation P through the opening 207 (and to assist the transfer of the preparation P into the container 3).

Preferably, the pressurized fluid is a gas (and still more preferably, air).

It should be noted that, advantageously, the transfer of the basic preparation P together with the extraction liquid (or mixture containing an extraction liquid) from the capsule 201 to the container 3 has considerable advantages in terms of machine cleaning, food safety and maintenance.

Moreover, the capsule can easily be emptied completely by means of the extraction liquid (or mixture containing an extraction liquid) without leaving residues of the product P inside it (this is especially true if the basic product P is a powder).

Preferably, the dilution liquid is water or a water based mixture or a milk-based mixture.

Preferably, the extraction liquid (or mixture containing an extraction liquid) is or comprises water or is a water based mixture or a milk-based mixture.

It should be noted that, preferably, according to another aspect, the method comprises a step of injecting a pressurized fluid (gas) into the cavity 205 of the capsule 201.

According to yet another aspect, the step of injecting a pressurized fluid into the cavity 205 of the capsule 201 comprises a step of injecting pressurized air into the cavity 205 of the capsule 201.

According to yet another aspect, the method comprises a step of deforming the side walls 204 of the capsule 201 by compression in order to squeeze the capsule 201.

Preferably, the above steps are substantially at least partly concurrent.

Preferably, the extraction liquid (or mixture containing an extraction liquid) is not supplied until the capsule 201 has been opened (that is to say, the step of injecting an extraction liquid or mixture containing an extraction liquid into the cavity 205 of the capsule 210 follows a step of preparing an opening 207 in the capsule).

According to yet another aspect, the step of preparing a capsule 201 comprises a step of making a bottom opening 207, in the base wall 203 and slidably inserting a nozzle 210 into the opening 207.

The nozzle 210 is provided with the first, upper hollow portion 213 communicating with the cavity 205 of the capsule through the plurality of openings 213a.

According to this aspect, the step of injecting the extraction liquid or the mixture containing an extraction liquid into the cavity 205 of the capsule 201 comprises a step of injecting extraction liquid into the cavity 205 of the capsule 201 through the holes or openings 213a.

It should be noted that, more generally speaking, the nozzle 210 is movable between a first position and second position.

According to another aspect, the step of preparing an opening 207 in the capsule 201 comprises a step of making an opening 207 in the capsule 201 in the base wall 203 of the capsule 201.

What is claimed is:
1. An ice cream machine, comprising:
  a batch freezing unit having:
    a processing container forming a processing chamber for making an ice cream product;
    a stirrer mounted inside the processing chamber;
    a motor operatively coupled to the stirrer to drive the stirrer in rotation;
    a cooling system including a heat exchanger thermally connected with the processing container, for exchanging heat with the processing container and cooling the processing container;
  a receiving unit for receiving and treating a capsule containing a basic preparation for an ice cream product and comprising a seat for loading the capsule;

a first injection device for injecting a dilution liquid, operatively connected with the processing container, for injecting the dilution liquid into the processing container;

a second injection device for injecting an extraction liquid or a mixture containing an extraction liquid, and which is operatively connected with the receiving unit to feed the extraction liquid or the mixture into the capsule to allow extracting the basic preparation from an interior of the capsule, the second injection device being configured and positioned to fluidly connect to a nozzle of the capsule positioned internally of the capsule for injecting the extraction liquid or the mixture containing the extraction liquid into the nozzle;

a duct positioned, in a flow direction of the basic preparation extracted from the capsule, downstream of the receiving unit and upstream of the processing container, to connect the receiving unit to the processing container and guide basic preparation extracted from the capsule into the processing chamber.

2. The machine according to claim 1, and further comprising a first regulating device for regulating a temperature of the extraction liquid or the mixture containing the extraction liquid and which is configured to heat and/or cool the extraction liquid or the mixture containing the extraction liquid to keep the extraction liquid at a predetermined temperature.

3. The machine according to claim 2, wherein the regulating device is configured to regulate the temperature of the extraction liquid or the mixture containing the extraction liquid to a predetermined temperature of between 5° C. and 85° C.

4. The machine according to claim 2, wherein the regulating device comprises a heater configured to heat the extraction liquid or the mixture containing the extraction liquid.

5. The machine according to claim 4, wherein the heater is configured to heat the extraction liquid or the mixture containing the extraction liquid to a temperature of between 30° and 85° C.

6. The machine according to claim 5, wherein the heater is configured to heat the extraction liquid or the mixture containing the extraction liquid to a temperature of between 35° and 60° C.

7. The machine according to claim 2, wherein the regulating device comprises a cooling device configured to cool the extraction liquid or the mixture containing the extraction liquid to a temperature of between 5° and 15° C.

8. The machine according to claim 2, and further comprising a control unit connected to the temperature regulating device to control the temperature regulating device and regulate the temperature of the extraction liquid or the mixture containing the extraction liquid.

9. The machine according to claim 8, and further comprising a user interface connected to the control unit and including controls to allow selecting a type of liquid or semi-liquid product from a list of possible products contained in the capsule and to send to the control unit a signal relating to the selection made to control the temperature regulating device and regulate the temperature of the extraction liquid or the mixture containing the extraction liquid as a function of the signal relating to the selection made.

10. The machine according to claim 8, wherein the control unit is also configured to control the temperature regulating device based on the item of information from the information code to regulate the temperature of the extraction liquid or the mixture containing the extraction liquid.

11. The machine according to claim 1, wherein the receiving unit comprises an injector for injecting a pressurized gaseous fluid and is configured to inject the pressurized gaseous fluid into the capsule so as to assist the extraction of the basic preparation from the capsule and transfer of the basic preparation to the processing container.

12. The machine according to claim 1, wherein the receiving unit comprises a movable loading element having a seat for loading the capsule, the movable loading element being movable between an extracted position for loading the capsule and a capsule insertion position.

13. The machine according to claim 1, wherein the receiving unit comprises an element of contact with an upper wall of the capsule which is movable between a spaced-apart position where the element of contact is spaced from the capsule and a contact and compression position where the element of contact compresses the upper wall of the capsule.

14. The machine according to claim 13, wherein the receiving unit comprises an actuator operatively coupled to the element of contact to move the element of contact between the spaced-apart position and the contact and compression position.

15. The machine according to claim 1, wherein the second injection device for injecting the extraction liquid or the mixture containing the extraction liquid is configured to make a fluid coupling with an internal cavity in the capsule.

16. The machine according to claim 1, and further comprising a tank for storing the extraction liquid or the mixture containing the extraction liquid, and a duct for connecting the storage tank to the second injection device.

17. The machine according to claim 1, wherein the processing container is between 156000 $mm^3$ and 1962600 $mm^3$ in volume.

18. A method for making ice cream in portions, comprising:
providing:
a batch freezing unit having:
a processing container forming a processing chamber for making an ice cream product;
a stirrer mounted inside the processing chamber;
a motor operatively coupled to the stirrer to drive the stirrer in rotation;
a cooling system including a heat exchanger thermally connected with the processing container, for exchanging heat with the processing container and cooling the processing container;
a receiving unit for receiving and treating a capsule containing a basic preparation for an ice cream product and comprising a seat for loading the capsule;
a first injection device for injecting a dilution liquid, operatively connected with the processing container, for injecting the dilution liquid into the processing container;
a second injection device for injecting an extraction liquid or a mixture containing an extraction liquid, and which is operatively connected with the receiving unit to feed the extraction liquid or the mixture into the capsule to allow extracting the basic preparation from an interior of the capsule, the second injection device being configured and positioned to fluidly connect to a nozzle of the capsule positioned internally of the capsule for injecting the extraction liquid or the mixture containing the extraction liquid into the nozzle;
a duct positioned, in a flow direction of the basic preparation extracted from the capsule, downstream of the receiving unit and upstream of the processing container, to connect the receiving unit to the processing container and guide basic preparation extracted from the capsule into the processing chamber;

providing the capsule containing the basic preparation;

feeding the extraction liquid or the mixture containing the extraction liquid into the capsule;

opening the capsule;

transferring the basic preparation and the extraction liquid or the mixture containing the extraction liquid from the capsule into the processing container;

feeding the dilution liquid into the processing container;

stirring and mixing the basic preparation, the extraction liquid and the dilution liquid with the stirrer, and simultaneously cooling the basic preparation and the dilution liquid to a temperature between −2° C. and −15° C. so as to make a portion of ice cream.

19. The method according to claim 18, and further comprising, before the step of feeding the extraction liquid or the mixture containing the extraction liquid into the capsule, a step of regulating the temperature of the extraction liquid or the mixture containing the extraction liquid to a predetermined temperature.

20. The method according to claim 19, wherein the step of regulating the temperature of the extraction liquid or the mixture containing the extraction liquid to the predetermined temperature comprises a step of selecting the temperature based on a command issued by a user or a reading of an information code combined with the capsule.

21. The method according to claim 18, wherein the temperature of the extraction liquid or the mixture containing the extraction liquid is different from the temperature of the diluting liquid.

22. The method according to claim 18, and further comprising a step of heating or cooling the extraction liquid or the mixture containing the extraction liquid to regulate the temperature of the extraction liquid or the mixture containing the extraction liquid to a first temperature value.

23. The method according to claim 18, and further comprising a step of heating or cooling the diluting liquid to regulate the temperature of the diluting liquid to a second temperature value.

24. The method according to claim 18, and further comprising, simultaneously with, or following the step of feeding the extraction liquid or the mixture containing the extraction liquid into the capsule, a step of injecting a pressurized gaseous fluid into the capsule to assist extraction of the basic preparation.

* * * * *